US011120367B2

(12) United States Patent
Kobayashi et al.

(10) Patent No.: US 11,120,367 B2
(45) Date of Patent: Sep. 14, 2021

(54) VALIDATING TRAINING DATA OF CLASSIFIERS

(71) Applicant: International Business Machines Corporation, Armonk, NY (US)

(72) Inventors: Takehiko Kobayashi, Koganei (JP); Hirofumi Matsuzawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 16/048,756

(22) Filed: Jul. 30, 2018

(65) Prior Publication Data

US 2020/0034751 A1 Jan. 30, 2020

(51) Int. Cl.
*G06N 20/00* (2019.01)
*G06N 3/00* (2006.01)
*G06F 40/40* (2020.01)

(52) U.S. Cl.
CPC ............. *G06N 20/00* (2019.01); *G06N 3/006* (2013.01); *G06F 40/40* (2020.01)

(58) Field of Classification Search
CPC ...... G06N 99/005; G06N 3/006; G06N 20/00; G06N 5/04; G06F 17/28; G06F 40/30; G06F 40/40; G06F 17/218; G06F 17/2785; G06F 16/3344; G06F 40/289; G06F 16/35; G06F 40/117; G06F 16/353; G06F 16/3346; G06F 16/3334; G06Q 10/107;

(Continued)

(56) References Cited

U.S. PATENT DOCUMENTS

| 7,206,389 B1 * | 4/2007 | Dumoulin | G10L 15/1822 |
| | | | 379/218.01 |
| 8,391,464 B1 * | 3/2013 | Sharp | H04M 3/5166 |
| | | | 379/265.01 |

(Continued)

OTHER PUBLICATIONS

Abuassba et al. "Improving Classification Performance through an Advanced Ensemble Based Heterogeneous Extreme Learning Machines". Hindawi Computational Intelligence and Neuroscience vol. 2017, Article ID 3405463, 11 pages <https://doi.org/10.1155/2017/3405463>.

(Continued)

*Primary Examiner* — Mouloucoulaye Inoussa
(74) *Attorney, Agent, or Firm* — Edward Li

(57) ABSTRACT

A method, a computer program product, and a computer system for evaluation and modification of training data for classifiers. A computer system applies an each piece of training data of an each class to multiple classifiers. The computer system performs evaluation and validation of the training data for the each class and defines at least one representative class for the each piece of the training data of the each class if classification precision of the each piece of the training data is greater than a predetermined threshold. The computer system modifies the training data, based on results of the evaluation and the validation of the training data for the each class. The computer system performs evaluation and validation of the training data for representative classes. The computer system modifies the training data, based on results of the evaluation and the validation of the training data for the representative classes.

18 Claims, 11 Drawing Sheets

(58) Field of Classification Search
CPC ...... G06K 9/66; G06K 9/6218; G06K 9/6269; G06K 9/6284
USPC ...... 706/12; 704/9, 235, 254, 257, 234, 276, 704/251, 271, 252, 244, E15.026, 704/E15.043; 379/265.01, 88.01, 88.04, 379/218.01
See application file for complete search history.

(56) References Cited

U.S. PATENT DOCUMENTS

| | | | | |
|---|---|---|---|---|
| 8,775,180 | B1* | 7/2014 | Pettay | G10L 25/48 704/246 |
| 8,849,664 | B1* | 9/2014 | Lei | G10L 17/14 704/246 |
| 9,367,526 | B1* | 6/2016 | Vozila | G06F 16/3344 |
| 9,411,672 | B1* | 8/2016 | Cooper | H04L 41/16 |
| 10,824,959 | B1* | 11/2020 | Chatterjee | G06N 20/00 |
| 2001/0051868 | A1* | 12/2001 | Witschel | G10L 15/197 704/9 |
| 2008/0021708 | A1* | 1/2008 | Bennett | G06F 40/58 704/257 |
| 2011/0302118 | A1* | 12/2011 | Melvin | G06N 20/00 706/21 |
| 2013/0024403 | A1* | 1/2013 | Chen | G06F 40/20 706/12 |
| 2014/0039888 | A1* | 2/2014 | Taubman | G10L 15/183 704/235 |
| 2014/0324434 | A1* | 10/2014 | Vozila | G10L 15/18 704/257 |
| 2015/0348541 | A1* | 12/2015 | Epstein | G10L 15/063 704/257 |
| 2016/0062985 | A1* | 3/2016 | Epstein | G06F 40/216 704/9 |
| 2016/0140957 | A1* | 5/2016 | Duta | G10L 15/063 704/244 |
| 2018/0018320 | A1 | 1/2018 | Boyer et al. | |

OTHER PUBLICATIONS

Breiman. "Random Forests". Machine Learning, 45(1): 5-32, 2001.

Breiman. "Bagging predictors". Machine Learning, 24(2):123-140, 1996.

Freund et al. "A decision-theoretic generalization of on-line learning and an application to boosting". Proceedings EuroCOLT'94: European Conference on Computational Learning Theory. LNCS. Fifteen pages.

Kohavi. "A Study of Cross-Validation and Bootstrap for Accuracy Estimation and Model Selection". Appears in the International Joint Conference on Artificial Intelligence (IJCIA) 1995. Seven pages.

Otero et al. "Induction of descriptive fuzzy classifiers with the Logitboost algorithm". Soft Comput (2006) 10: 825-835.

Schapire et al. "Boosting the margin: A new explanation for the effectiveness of voting methods". Machine Learning: Proceedings of the Fourteenth International Conference, 1997.

* cited by examiner

| Data Portion | Class Value | Classifier #1 | Classifier #2 | Classifier #3 | Classifier #4 | Classifier #5 | Classifier #6 | ... | Classifier #n | Precision | Representative Class |
|---|---|---|---|---|---|---|---|---|---|---|---|
| QX_#1 | X | X | X | X | X | X | X | ... | X | 100% | X |
| QX_#2 | X | X | X | B | X | X | X | ... | X | 88% | X |
| QX_#3 | X | B | B | X | X | X | X | ... | B | 63% | X |
| QX_#4 | X | B | C | D | F | X | X | ... | E | 38% | N/A |
| QX_#5 | X | B | B | B | B | X | B | ... | B | 25% | B |
| QX_#6 | X | B | B | B | B | X | B | ... | B | 25% | B |
| ... | ... | ... | ... | ... | ... | ... | ... | ... | ... | ... | ... |
| QX_#k | X | B | C | B | B | C | C | ... | X | 13% | B or C |

FIG. 10

| Data Portion | Class Value | Classifier #1 | Classifier #2 | Classifier #3 | Classifier #4 | Classifier #5 | Classifier #6 | ... | Classifier #n | Precision | Representative Class |
|---|---|---|---|---|---|---|---|---|---|---|---|
| QZ_#1 | Z | Z | Z | Z | Z | Z | Z | ... | Z | 100% | Z |
| QZ_#2 | Z | Z | Z | Z | Z | Z | Z | ... | Z | 88% | Z |
| QZ_#3 | Z | B | B | Z | Z | Z | Z | ... | B | 63% | Z |
| QB_#4 | B | B | Z | Z | Z | B | B | ... | Z | 38% | Z |
| QB_#5 | B | X | X | X | X | B | X | ... | B | 25% | Z |
| QB_#6 | B | X | X | X | X | B | X | ... | B | 25% | Z |
| ... | ... | ... | ... | ... | ... | ... | ... | ... | ... | ... | ... |
| QA_#N | A | B | C | B | B | C | C | ... | A | 13% | B or C |

FIG. 11

VALIDATING TRAINING DATA OF CLASSIFIERS

BACKGROUND

The present invention relates generally to validating training data of classifiers, and more particularly to evaluating and modifying training data of classifiers of an automatic answering system.

A huge amount of data, including semi-structured and unstructured data, is called big data. In recent years, technologies to utilize big data to business activities and medical services have been attracting attentions. Especially, the technologies such as cognitive computing and deep learning have been applied for such fields. Cognitive computing provides ability of recognizing natural language, voice, and image data. Deep learning has dramatically improved the accuracy of machine learning by learning a huge amount of data.

An automatic answering system is a system which applies those technologies. The automatic answering system provides an answer to a question in natural language, such as voices or typed text. In such a system, the question is classified based on the intention of the question by using a classifier (e.g., IBM® Watson™ Natural Language Classifier) and then an answer is provided. The classifier is one of machine learning technologies and is also called supervised learning. The classifier will be trained by supervised training data including the data portion and the class, then it enables to classify unsupervised data into most appropriate class. For natural language classification, the intention of the question is treated as class and the statement of the question is treated as the data portion. Also, in order to increase the accuracy of the classifier, it is more preferable that the volume of training data is larger. However, in the case of the automatic answering system described above, the data portion is a question statement written by natural language, and thus there exist the following problems. (1) It is not easy to gather question statements. (2) Intentions of the question statements gathered as training data often have content specialized in particular domain, and thus it is necessary to individually validate and determine the intentions by experts of the individual domains or the like. In some cases, question statements may be created, such as a question statement having ambiguous content, including an expression that cannot be correctly recognized by natural language processing. (3) Misclassifications often occur. For example, the newly added question statement fails to be correctly classified as the added intention (or class), and a question statement which has been classified as another intention in the conventional training data is classified as the added intention (class).

It has been known that a larger volume of data should be preferably available to increase the accuracy of machine learning. It has been also known that the classification accuracy is increased by removing data resulting in noise (which is the data that cannot be correctly classified or decreases the learning accuracy). Methods have been studied for increasing the accuracy of the classifier by removing the noise data. However, in the case of an automatic answering system, only increasing the precision of the classifier does not necessarily contribute to improve the performance of the automatic answering system.

SUMMARY

In one aspect, a method for evaluation and modification of training data for classifiers is provided. The method includes applying, by a computer system, an each piece of training data of an each class to multiple classifiers. The method further includes performing, by the computer system, evaluation and validation of the training data for the each class. The method further includes defining, by the computer system, at least one representative class for the each piece of the training data of the each class if classification precision of the each piece of the training data is greater than a predetermined threshold. The method further includes modifying, by the computer system, the training data to create a first modified training data, based on results of the evaluation and the validation of the training data for the each class. The method further includes performing, by the computer system, evaluation and validation of the first modified training data for representative classes. The method further includes modifying, by the computer system, the first modified training data to create a second modified training data, based on results of the evaluation and the validation of the first modified training data for the representative classes.

In another aspect, a computer program product for evaluation and modification of training data for classifiers is provided. The computer program product comprising one or more computer-readable tangible storage devices and program instructions stored on at least one of the one or more computer-readable tangible storage devices. The program instructions are executable to: apply, by a computer system, each piece of training data of an each class to multiple classifiers; perform, by the computer system, evaluation and validation of the training data for the each class; define, by the computer system, at least one representative class for the each piece of the training data of the each class if classification precision of the each piece of the training data is greater than a predetermined threshold; modify, by the computer system, the training data to create a first modified training data, based on results of the evaluation and the validation of the first modified training data for the each class; perform, by the computer system, evaluation and validation of the training data for representative classes; and modify, by the computer system, the first modified training data to create a second modified training data, based on results of the evaluation and the validation of the first modified training data for the representative classes.

In yet another aspect, a computer system for evaluation and modification of training data for classifiers is provided. The computer system comprises one or more processors, one or more computer readable tangible storage devices, and program instructions stored on at least one of the one or more computer readable tangible storage devices for execution by at least one of the one or more processors. The program instructions are executable to apply, by a computer system, an each piece of training data of an each class to multiple classifiers. The program instructions are further executable to perform, by the computer system, evaluation and validation of the training data for the each class. The program instructions are further executable to define, by the computer system, at least one representative class for the each piece of the training data of the each class if classification precision of the each piece of the training data is greater than a predetermined threshold. The program instructions are further executable to modify, by the computer system, the training data to create a first modified training data, based on results of the evaluation and the validation of the training data for the each class. The program instructions are further executable to perform, by the computer system, evaluation and validation of the first modified training data for representative classes. The program instructions are further executable to modify, by the computer system, the first modified training data to create a second modified training data, based on results of the evaluation and the validation of the first modified training data for the representative classes.

BRIEF DESCRIPTION OF THE SEVERAL VIEWS OF THE DRAWINGS

FIG. 10 is a table illustrating evaluation and validation of training data with class values (analysis of a type I error), in accordance with one embodiment of the present invention.

FIG. 11 is a table illustrating evaluation and validation of training data for representative classes (analysis of a type II error), in accordance with one embodiment of the present invention.

DETAILED DESCRIPTION

Figure 1:
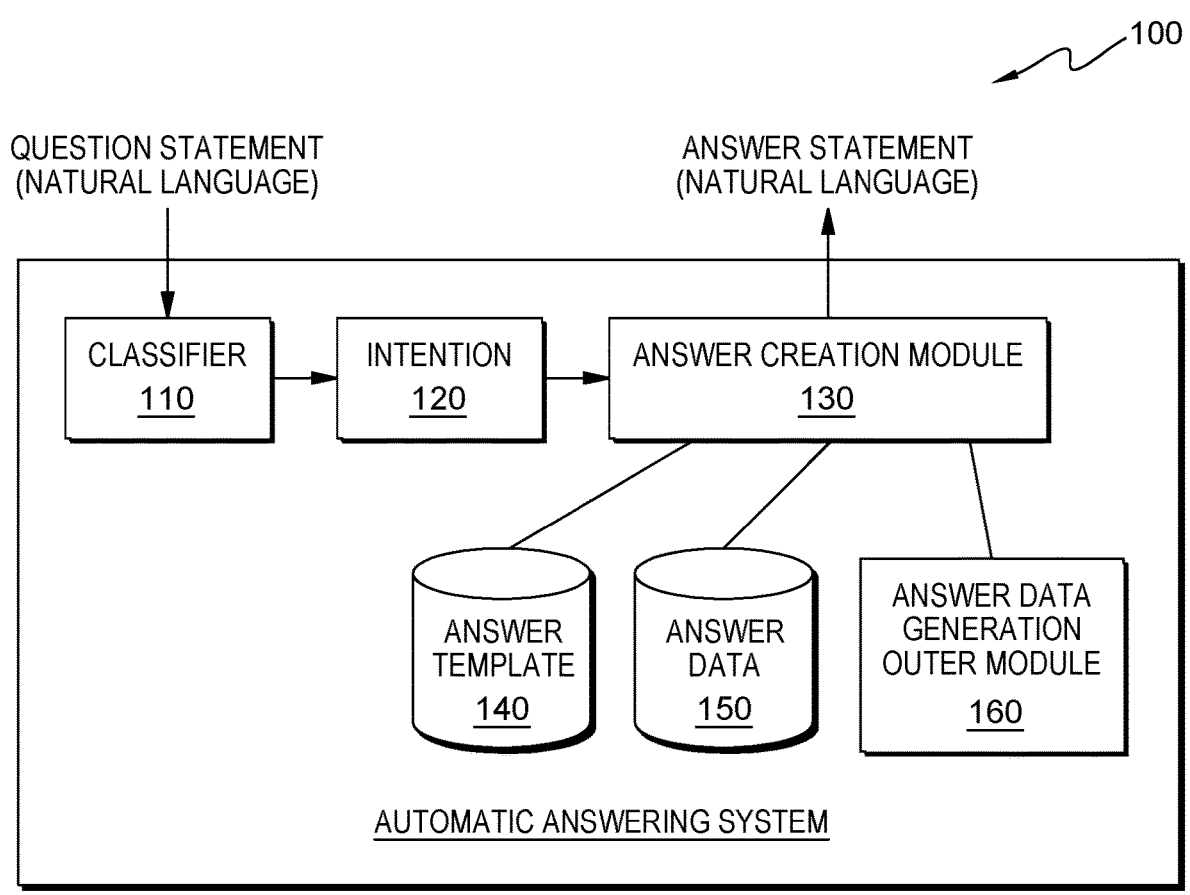
FIG. 1 is a diagram illustrating an example of an automatic answering system, in accordance with one embodiment of the present invention.

Embodiments of the present invention discloses a method for determining an intention of a natural language question by classifying a statement of the natural language question and returning a satisfactory answer in accordance with the intention. The method is used to validate training data of a classifier and modify the training data of the classifier based on the validation result. The method is used to facilitate revision and improvement of training data. As a result, the method of the present invention does not only contributes to increased accuracy of the classifier used by an automatic answering system but also to improvement of the precision of the automatic answering system.

In the embodiments of the present invention, for the automatic answering system, in order to enable the classifier to correctly classify the intention of the question and to provide appropriate answers, a question statement, the intention, and an answer statement associated with the intention need to be prepared. The answer statement is configured as a template; data is separately acquired in a static or dynamic manner from the content of the question to complete the template, and thus responds to the user is performed. Training data is used for learning by the classifier. The training data includes a question statement as its data portion and an intention as its class.

In an actual project, training data consisting of 1,000 to 2,000 question statements and around 100 intentions (or classes) are considered. Although the number of classes and size of training data differ in various business requirements, an algorithm for classification is required to realize sufficient accuracy. In general, the more the question statements, the better the classification. Actually, the upper limit is specified for the total number of the question statements (training data), while there is the business requirement that the number of classes (intentions) should be as many as possible; therefore, it has been prioritized to increase the classes instead of the training data of the class at issue, if it is possible to classify with sufficient accuracy without increasing the number of questions (training data) for one class.

To realize this, a possible bad training data which tends to cause misclassification will be treated instead of being deleted. For example, the bad training data will be modified by adding new words and rewriting the statement of question, by changing the intention (class) of question, and by adding new class for ambiguous question statement. With regard to multiple similar intentions (classes), it will be necessary to carry out measures as appropriate such as merging two intentions (classes).

Embodiments of the present invention discloses a method for evaluating and validating training data and providing assisting information for revision of the training data to improve the classification accuracy of a classifier in machine learning.

In current technologies, misclassified training data may be removed as a noise, the weighting of misclassified training data is modified to make it possible to correctly classify the training data having a feature different than those of the other pieces of training data. The present invention differs from the current technologies; the method in the present invention uses modified training data to increase the classification accuracy of a classifier. Also, the method in the present invention evaluates and validates the training data and assists revision of the training data.

In the embodiments of the present invention, one learning algorithm is used. Evaluation and validation of the training data are performed on a per-class basis so as to evaluate the training data that is classified as a type I error. In this way, multiple training data sets are created for each to-be-evaluated class and a classifier is created from the each of the multiple training data sets. By using multiple classifiers that have been created, the training data of the to-be-evaluated class is validated. Instead of simple true-or-false determination, evaluation and validation are performed on the classes output by the multiple classifiers. In the embodiments of the present invention, characteristics of the misclassified training data are analyzed, and thereby the class can be automatically modified and/or information is provided for assisting consideration how to modify it. By merging the results of validation performed in a per-class basis, validation of the misclassified training data, including the training data classified as a type II error, is performed, in order to provide the information for considering modifying the training data.

FIG. 1 is a diagram illustrating automatic answering system 100, in accordance with one embodiment of the present invention. Automatic answering system 100 includes classifier 110. Classifier 110 receives a question statement which is a natural language. Automatic answering system 100 further includes intention 120. Intention 120 is determined by classifying the natural language question statement. Automatic answering system 100 further includes answer creation module 130, answer template 140, answer data 150, and answer data generation outer module 160. An answer statement corresponding to intention 120 is statically and dynamically generated by answer creation module 130 from answer template 140, answer data 150, and answer data generation outer module 160.

Figure 2:
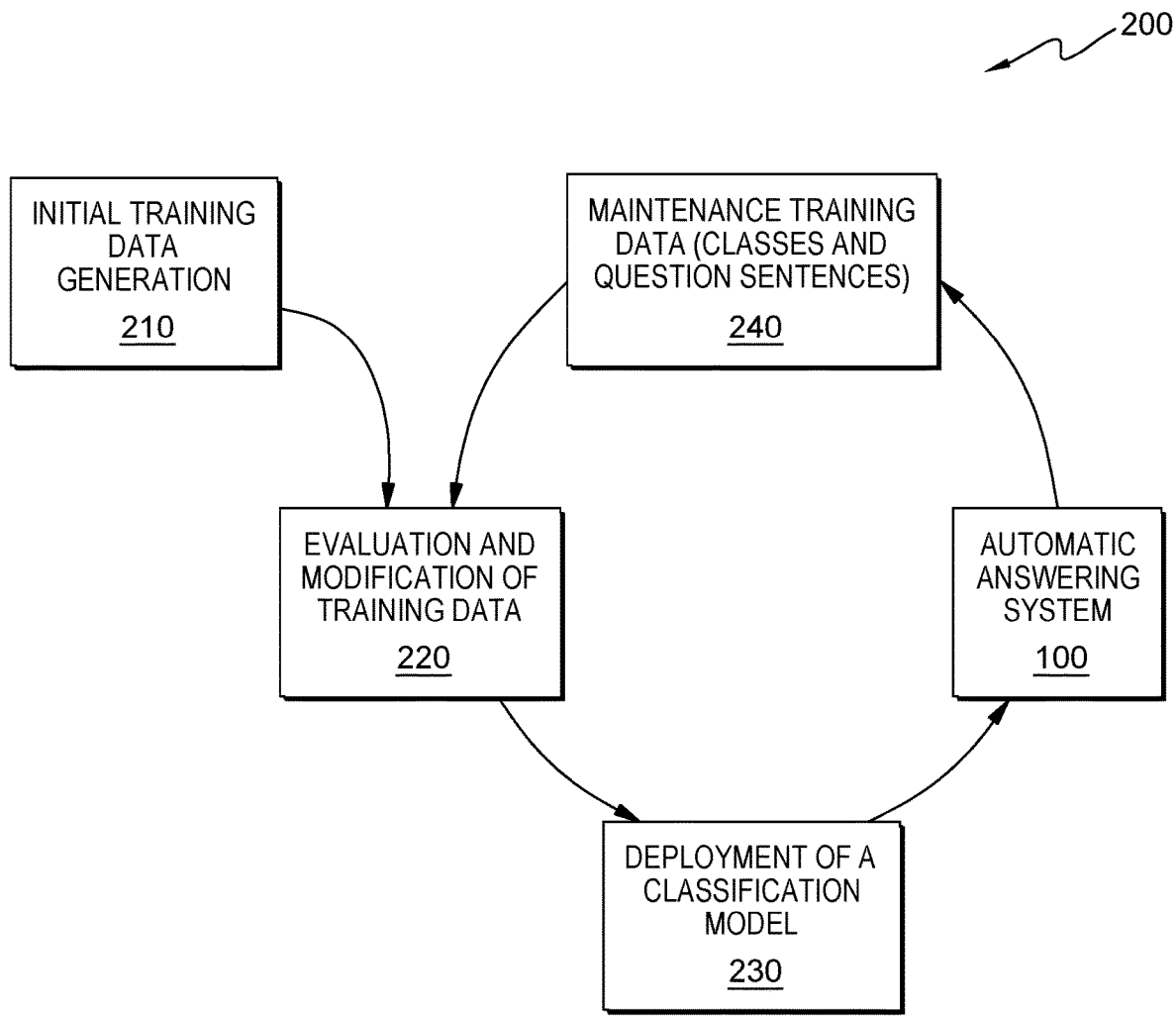
FIG. 2 is a diagram illustrating a typical life cycle of training data for a cognitive classifier, in accordance with one embodiment of the present invention.

FIG. 2 is a diagram illustrating typical life cycle 200 of training data for a cognitive classifier, in accordance with one embodiment of the present invention. Life cycle 200 includes phase 210 of initial training data generation 210, phase 220 of evaluation and modification of training data, phase 230 of deployment of a classification model, and phase 240 of maintenance of training data. The method disclosed by embodiments of the present invention is used in phase 220 of evaluation and modification of training data. The phases will be discussed in the following paragraphs with reference to FIG. 3, FIG. 4, and FIG. 5.

Figure 3:
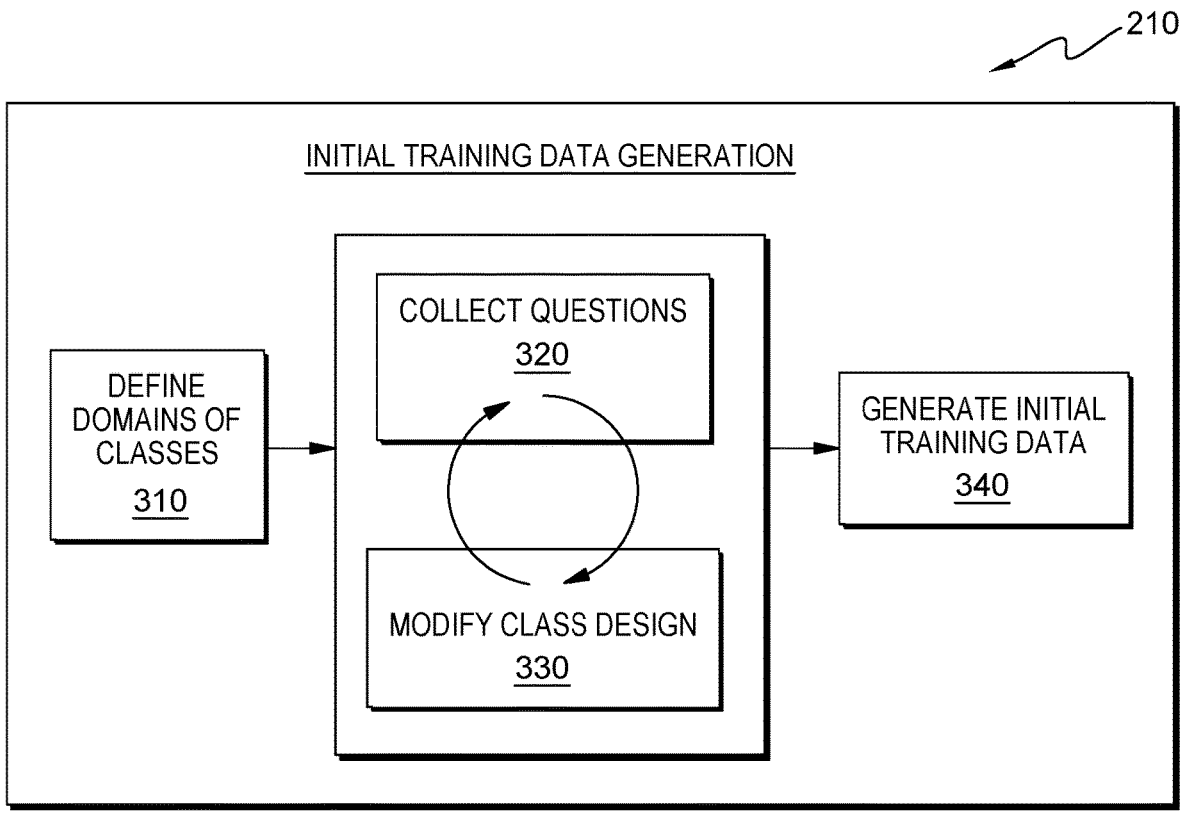
FIG. 3 is a diagram illustrating a phase of initial training data generation in a typical life cycle of training data for a cognitive classifier, in accordance with one embodiment of the present invention.

FIG. 3 is a diagram illustrating phase 210 of initial training data generation in a typical life cycle of training data for a cognitive classifier, in accordance with one embodiment of the present invention. The goal of phase 210 of initial training data generation is to create initial training data. As shown in FIG. 3, phase 210 of initial training data generation includes step 310: define domains of classes. A user defines target topics (or the domains of the classes) to be answered by automatic answering system 100 and completes the initial class design. Phase 210 of initial training data generation further includes step 320: collect questions. The user collects questions on the target topics or the question sentences are generated by themselves for each class. The user screens out bad sentences for each class. Phase 210 of initial training data generation further includes step 330: modify class design. At this step, the user modifies the class design by merging the classes, inserting new class for unexpected questions within the scope of target topics. Steps 320 and 330 are repeated for multiple times. Phase 210 of initial training data generation further includes step 340: generate initial training data.

Figure 4:
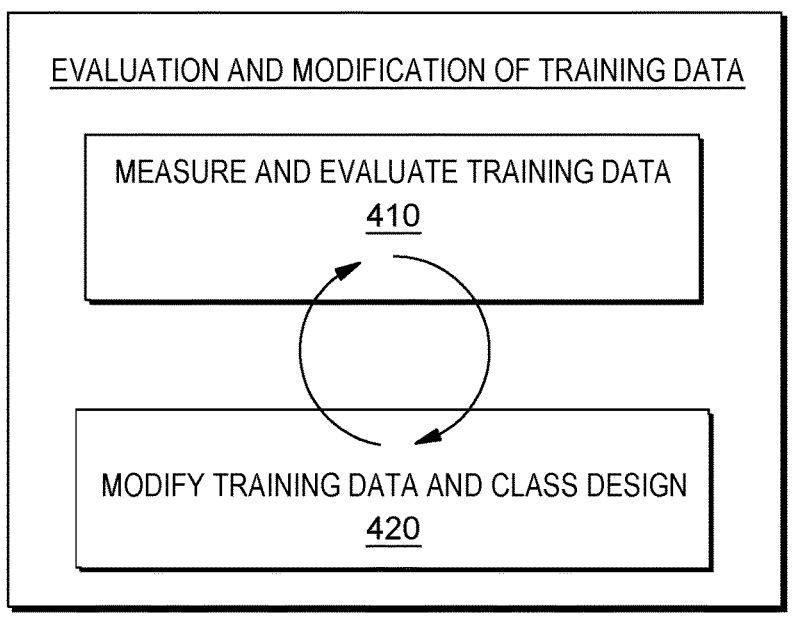
FIG. 4 is a diagram illustrating a phase of evaluation and modification of training data in a typical life cycle of training data for a cognitive classifier, in accordance with one embodiment of the present invention.

FIG. 4 is a diagram illustrating phase 220 of evaluation and modification of training data in a typical life cycle of training data for a cognitive classifier, in accordance with one embodiment of the present invention. The goal of phase 220 of evaluation and modification of training data is to obtain modified training data with target accuracy of classification. Phase 220 of evaluation and modification of training data includes step 410: measure and evaluate training data. A computer measures and evaluates the training data by creating learned classification model and tests it by some methods for example k-fold cross validation for measuring classification accuracy. The computer checks whether the accuracy of the classification result meets a target or not. If the classification accuracy meets the target, the life cycle of training data will go to phase 230 of deployment of a classification model; otherwise, step 420 will be implemented. Phase 220 of evaluation and modification of training data further includes step 420: modify training data and class design. At step 420, misclassified training data is modified in some ways, such as modification of the question sentences, removing the data, or changing its class, merging classes, and so on. Steps 410 and 420 are repeated until the accuracy meets the target.

In phase 230 of deployment of a classification model, a computer obtains the classification model learned by the applying classification algorithm to the whole training dataset and deploys it to automatic answering system 100 for production. An actual system using classifiers has a learning function which starts with reading training data, applies the classification algorithm the data to generate a classification model, and deploys the learned model to classifiers in the system.

Figure 5:
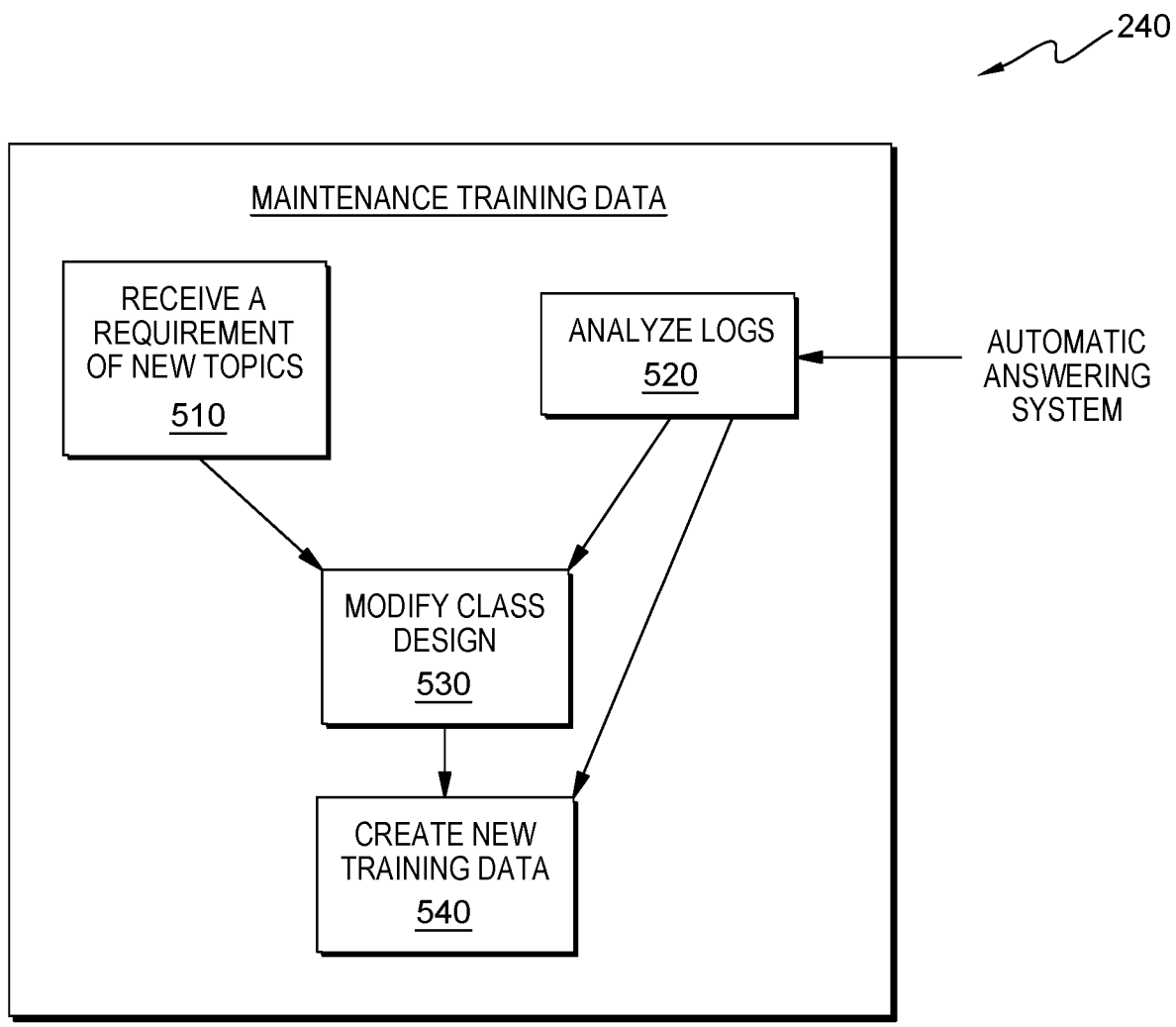
FIG. 5 is a diagram illustrating a maintenance phase in a typical life cycle of training data for a cognitive classifier, in accordance with one embodiment of the present invention.

FIG. 5 is a diagram illustrating phase 240 of maintenance of training data in a typical life cycle of training data for a cognitive classifier, in accordance with one embodiment of the present invention. The goal of phase 240 of maintenance training data is to create new training data to improve accuracy. Phase 240 of maintenance of training data includes step 510: receive a requirement of new topics. Stakeholders of automatic answering system 100 may expand the topics which the system can answer; therefore, the new classes for additional topics are required. Phase 240 of maintenance of training data further includes step 520: analyze logs. From system logs or feedback from users, the accuracy of the actual classification results can be obtained from automatic answering system 100 and is analyzed. If the accuracy of the actual classification results is lower, step 530 is implemented. Phase 240 of maintenance of training data further includes step 530: modify class design. The training date is modified to improve the accuracy. Phase 240 of maintenance of training data further includes step 540: create new training data. The maintenance of training data includes modifying the class design and collecting new question sentences for new classes, or changing question sentences for merged classes, or changing the classes for misclassified data.

Figure 6:
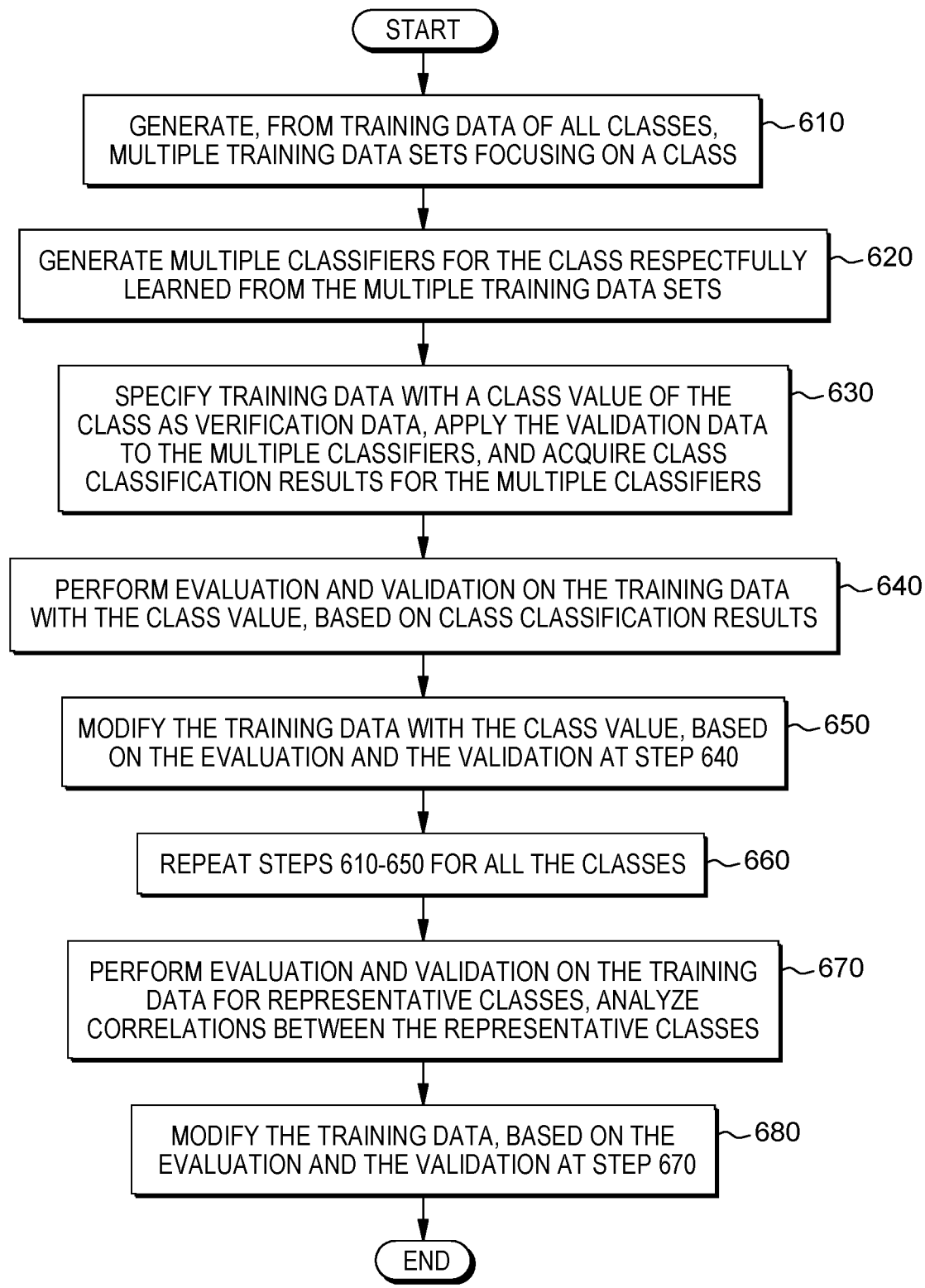
FIG. 6 is a flowchart showing operational steps for evaluation and modification of training data for classifiers of an automatic answering system, in accordance with one embodiment of the present invention.

FIG. 6 is a flowchart showing operational steps for evaluation and modification of training data for classifiers of an automatic answering system, in accordance with one embodiment of the present invention. The operational steps are implemented by a computer system or server, which is descripted in detail in later paragraphs with reference to FIG. 12.

Figure 7:
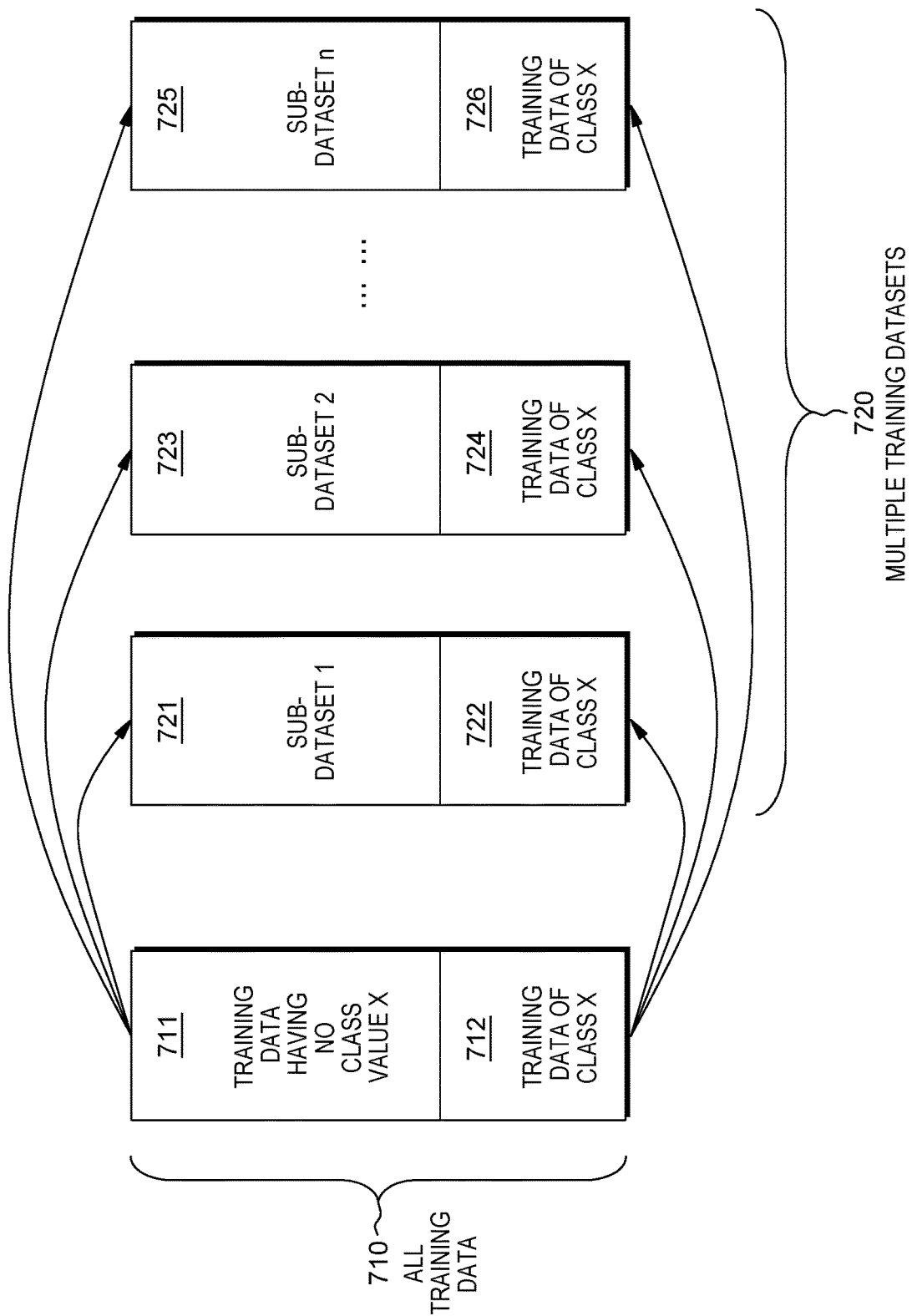
FIG. 7 is a diagram illustrating generation of multiple training data sets focusing on a class, in accordance with one embodiment of the present invention.

At step 610, the computer system or server generates, from training data of all classes, multiple sets of training data focusing on a class. FIG. 7 is a diagram illustrating generation of multiple training data sets focusing on a class, in accordance with one embodiment of the present invention. For example, as shown in FIG. 7, the computer system or server generates multiple training data sets 720 focusing on class X, from all training data 710. All training data 710 is divided into two parts: training data 712 of class X and training data 711 having no class value X. Training data 712 of class X is added to all of multiple training data sets 720, i.e., training data 722, 724, and 726 of class X in multiple training data sets 720. Part of training data 711 having no class value X is extracted by random sampling or similar methods and then is merged with training data 722, 724, and 726 of class X, i.e., sub-dataset 1 (721), sub-dataset 2 (723), and through sub-dataset n (725). Thus, n training data sets (multiple training data sets 720) are generated. In addition to the random sampling, training data having no class value X may be divided into n pieces, k pieces of which may be randomly selected to be merged with all the pieces of training data of class X.

Figure 8:
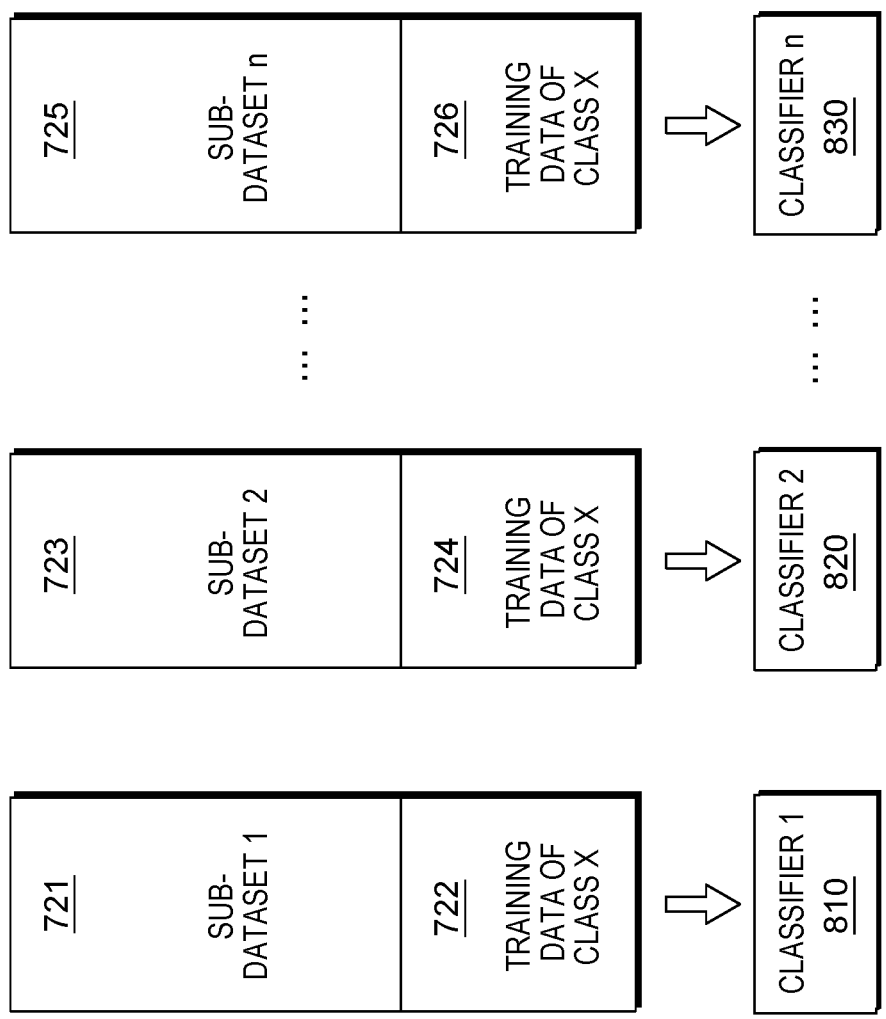
FIG. 8 is a diagram illustrating generation of multiple classifiers for a class, in accordance with one embodiment of the present invention.

Referring to FIG. 6, at step 620, the computer system or server generates multiple classifiers for the class respectfully learned from the multiple training data sets. FIG. 8 is a diagram illustrating generation of multiple classifiers for a class, in accordance with one embodiment of the present invention. For example, as shown in FIG. 8, the computer system or server generates classifier 1 (810), classifier 2 (820), and through classifier n (830) for class X; as a results, n classifiers are generated.

As described in earlier paragraphs, the training data from which each classifier learns includes all the pieces of training data of a focused class (such as class X). Consequently, even in a situation where only pieces of training data of a certain class at most in the order of 10 to 20 pieces are available, for the training data of class X, without being affected by the other pieces of training data that have been randomly picked up, it is made possible to evaluate and validate whether the pieces of data can be correctly learned or not.

In the case of division is carried out using the simple n-fold cross validation methodology, classes having a small number of training data relatively decrease, due to the dispersion of the training data of such classes. As a result, learning and validation are performed with the insufficient number of training data. Therefore, the simple n-fold cross validation methodology is not suitable for the purpose of validation of a per-class basis.

Figure 9:
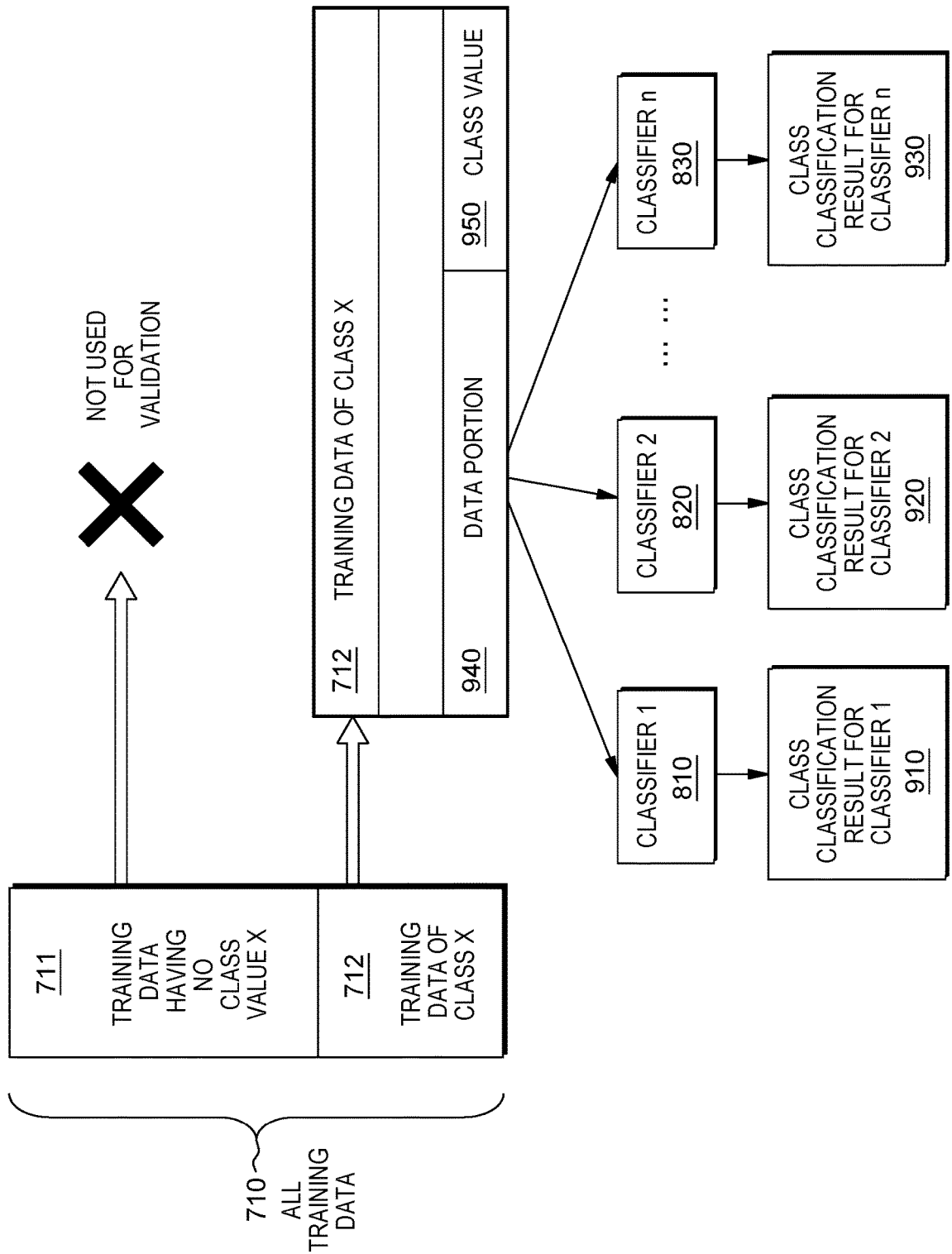
FIG. 9 is a diagram illustrating that validation data is applied to multiple classifiers and classification results are acquired, in accordance with one embodiment of the present invention.

Referring to FIG. 6, at step 630, the computer system or server specifies training data with a class value of the class (for example class X) as verification data and applies the validation data to the multiple classifiers. After applying the validation data to the multiple classifiers, results of class classification for multiple classifiers are output and acquired. Training data of other classes are not used as the validation data. FIG. 9 is a diagram illustrating that validation data is applied to multiple classifiers, in accordance with one embodiment of the present invention. As shown in FIG. 9, for example, training data 712 of class X is specified as the validation data and applied to classifier 1 (810), classifier 2 (820), and through classifier n (830) (which are generated at step 620). Training data 711 having no class value X is not used in the validation. k pieces of training data with a class value of X are applied to n classifiers, (e.g., classifier 1 810, classifier 2 820, and through classifier n 830) to carry out class classification. As shown in FIG. 9, each piece of the training data with a class value of X includes data portion 940 and class value 950. Class classification result 910 for classifier 1 810, class classification result 920 for classifier 2 820, and class classification result 930 for classifier n 830 are acquired; the results are acquired by comparison with correct answers.

Referring to FIG. 6, at step 640, the computer system or server performs evaluation and validation of the training data with the class value (for example X for training data class X), based on the class classification results which are acquired at step 630. Both the evaluation of the individual pieces of training data and the evaluation of entire class X are carried out. Information for revision of the classification is provided based on the results of evaluation. Analysis is performed on the type I error. Specifically, the computer system or server determines whether the training data that has been classified as the class X is correctly classified, by performing the evaluation and the validation. The analysis is performed on any piece of the training data that has been misclassified as another class.

FIG. 10 is a table illustrating evaluation and validation of training data with class value X (analysis of a type I error), in accordance with one embodiment of the present invention. The table shown FIG. 10 shows an example considering a case where classifiers output only one class.

Some classifies, such as classification algorithms using neural networks and similar algorithms, return multiple classes with confidence; in such a case, the class having the highest confidence should be adopted. The precision and the representative class are defined and the analysis method will be described below.

The precision is defined as a ratio (k/n), where n is the number of classifiers, and k is the number of classifiers which classified correctly. Among the pieces of training data, if the precision exceeds the predefined criteria, then the pieces of training data are regarded as OK; otherwise, the pieces of training data are candidates of the training data revision. For example, shown in the table of FIG. 10, QX_#1, QX_#2, and QX_#3 in the "data portion" column are the relevant training data; QX_#1, QX_#2, and QX_#3 have high precision (as shown in "precision" column) and they are appropriate training data.

The representative classes are classes estimated from n classifiers. Among the classes that have been output by multiple classifiers, one or more classes that have been output and whose output counts are equal to or larger than a predefined criteria are defined as one or more representative classes. In other words, if the precision is equal to or larger than the criteria, then the representative class will be identical with the to-be correct answer class. For example, shown in the table of FIG. 10, QX_#5, QX_#6 fall under this category.

For classes having the highest two output counts, if a sum of them exceeds the predefined criteria, then the two classes can be defined as the representative classes. For example, shown in the table of FIG. 10, QX_#k falls under this category.

When representative class is ambiguous and not easy to determine, N/A is assigned to the representative class. For example, shown in the table of FIG. 10, QX_#4 in the "data portion" column corresponds to this case; its representative class is undefined, which may be caused by ambiguous question statements.

By using the precision and the representative class, the following analyses can be performed for the training data of class X.

Class change—If classification is not correct, a representative class is the candidate class; thus, the training data is modified to change class. Also, it is possible to rewrite a question statement. The class value of the training data seems not to be satisfactory, then it is necessary to change the class value to be suitable class value for the question statement.

Inter-class ambiguity validation: With regards to training data that have two representative classes (e.g., QX_#k shown in the table of FIG. 10), its question statement is ambiguous. In the case of QX_#k, it is needed to determine whether class B or C should be selected or class B and C should be merged.

Validation of questions of low relevance: If a question statement of the training data is ambiguous or a question statement has no relevance to the class X, a representative class cannot be defined or the training data of other than class X is misclassified as class X. In such a case, the question statement and the intention (class) are inappropriate.

When the precision ratio is relatively lower than a predetermined value, then changing the class value or changing the question sentences of the training data is needed. If the class value of the training data is not satisfactory, then it is necessary to change the class value to a suitable class value for the question statement. When a user does not want to change the class, the user wants to change a statement in the class. In changing the question sentence, new words are added and some words are removed from the original statement. When precision ratio is relatively low, if the representative class (shown in the table of FIG. 10) is neither N/A nor plural, then the representative class suggests the class to be changed to; otherwise, it need to be considered to change the question statement or remove unsatisfactory data from the training data.

At step 640, not only the individual analysis of the training data but also analysis of multiple pieces of data (such as QX_#1 through QX_#k shown in the table of FIG. 10) can be implemented. Analysis of multiple pieces of validation data that have been misclassified: In the pieces of validation data that have been misclassified, it can be found that not only the data corresponding to the same representative class exists but also classes involved in the misclassification are the same or the pattern of correct and incorrect with compared on a per-classifier basis. In such a case, it might be found that the question statements of the training data have the same or similar phraseology or any other relevant facts. In this case, it is also possible to consider deletion of the substantially identical question statement (training data).

Furthermore, analysis on a per-class basis can be performed. Analysis on class X: For all pieces of the training data of the class X, an average of their precision or the ratio of the relevant data, which is regarded as OK, may be determined to evaluate this class. This can be used in discrimination between strong and weak fields by relative comparison with other classes in addition to absolute evaluation among the content of questions that the automatic answering system that has been configured needs to handle.

At step 650, the computer system or server modifies the training data with the class value X, based on the evaluation and the validation at step 640. Modifying the training data includes changing the class value. In response to determine that the precision ratio is lower than a predetermined threshold and the representative class is a single class, the computer system or server changes the current class to the representative class. For example, shown in the table of FIG. 10, regarding to QX_#5 and QX_#6, the computer system or server changes their classes from X to B.

Modifying the training data includes deleting the training data. Deleting the training data is needed when a question sentence of the corresponding training data is ambiguous or independent to the class. In response to determine that the precision ratio is relatively lower than a predetermined threshold and the representative class is plural, the computer system or server deletes the training data. Note that the predetermined threshold is not necessarily the same as that in the case of changing the training data. For example, shown in the table of FIG. 10, regarding to QX_#k whose representative class is B or C, the computer system or server deletes the training data of QX_#k.

At step 660, the computer system or server repeats steps 610-650 for all classes. For all the classes, steps 610-650 are repeatedly performed. Through step 660, all results of the validation of the all classes are merged. The merged validation results are sorted on a per-representative class basis.

At step 670, the computer system or server performs evaluation and validation of the training data for representative classes and analyzes correlations between the representative classes. Through analyzing correlations between the representative classes, methods for modifying the training data are considered. Through step 660, results of the validation of the all classes are sorted on the per-representative class basis and therefore analysis of the type II error is performed.

FIG. 11 is a table illustrating evaluation and validation of training data for representative classes (analysis of a type II error), in accordance with one embodiment of the present invention. The table of FIG. 11 gives an example of the evaluation and validation of the training data for the representative classes.

Even from the viewpoint of the representative class, it is made possible to determine the training data that can be correctly classified using the same criterion and to suggest the class change for the training data having a different class value as well.

For example, shown in the table of FIG. 11, QZ_#1, QZ_#2, and QZ_#3 in the "data portion" column are have high precision (shown in "precision column") and they are appropriate training data. Shown in the table of FIG. 11, QB_#4 in the "data portion" column has been classified as class B and it is considered to be changed to class Z.

By performing the evaluation and validation of the training data at both steps 640 and 670, both of type I and type II error are validated, the advantages of which are as follows. Evaluation and validation of type I and type II errors: For example, in the analysis at step 640, even when all pieces of data of the class Y have been correctly classified as the class Y but, in the classifications on a per-representative class basis, many pieces of data of other classes are misclassified as the class Y, it will be appreciated that the training data of the class Y is not necessarily valid and then a method for modifying it should be considered.

For all the classes, the following classification can be achieved using the patterns of misclassification. Analysis of inter-class correlation: Among the pieces of training data of classes A and B, if the data of class A which has been misclassified tends to be classifies as class B, and if the data of class B which has been misclassified tends to be classified as class A on the other hand, then it may be suggested that merging be performed on the classes A and B. With regard to an ambiguous question, another intention (class) may be added.

When several question statements do not have satisfactory class values within classes in the training data, a new class needs to be created and class values need to be assigned to the corresponding training data.

At step 680, the computer system or server modifies the training data, based on the evaluation and the validation at step 670. Modifying the training data includes removing a class. In response to determine that the precision ratio for certain correct class is relatively lower than a predetermined threshold and the representative class is plural, the computer system or server deletes the training data. For example, shown in the table of FIG. 11, regarding to QA_#N whose representative class is B or C, the computer system or server deletes the training data of QA_#N.

Modifying the training data includes merging multiple classes to one. For several focused classes, when both of the precision ratio for each focused class are lower than predetermined threshold and representative class belongs to others, then those two class is merged to one class. For example, when training data of class A tends to be classified to class B and training data of class B tends to be classified to class A, it is better to merge classes A and B to single class C (or just merge class B to class A) than to change all question sentences which misclassified. QB_#4, QB_#5, and QB_#6 (shown in the table of FIG. 11) are samples for this case.

Although the embodiments of the present invention disclose a method applied to a cognitive automatic answering system that accepts natural language as inputs and returns answers, the method is also applicable to supervised learning algorithms that needs to modify the training data to improve the accuracy of the training data.

Figure 12:
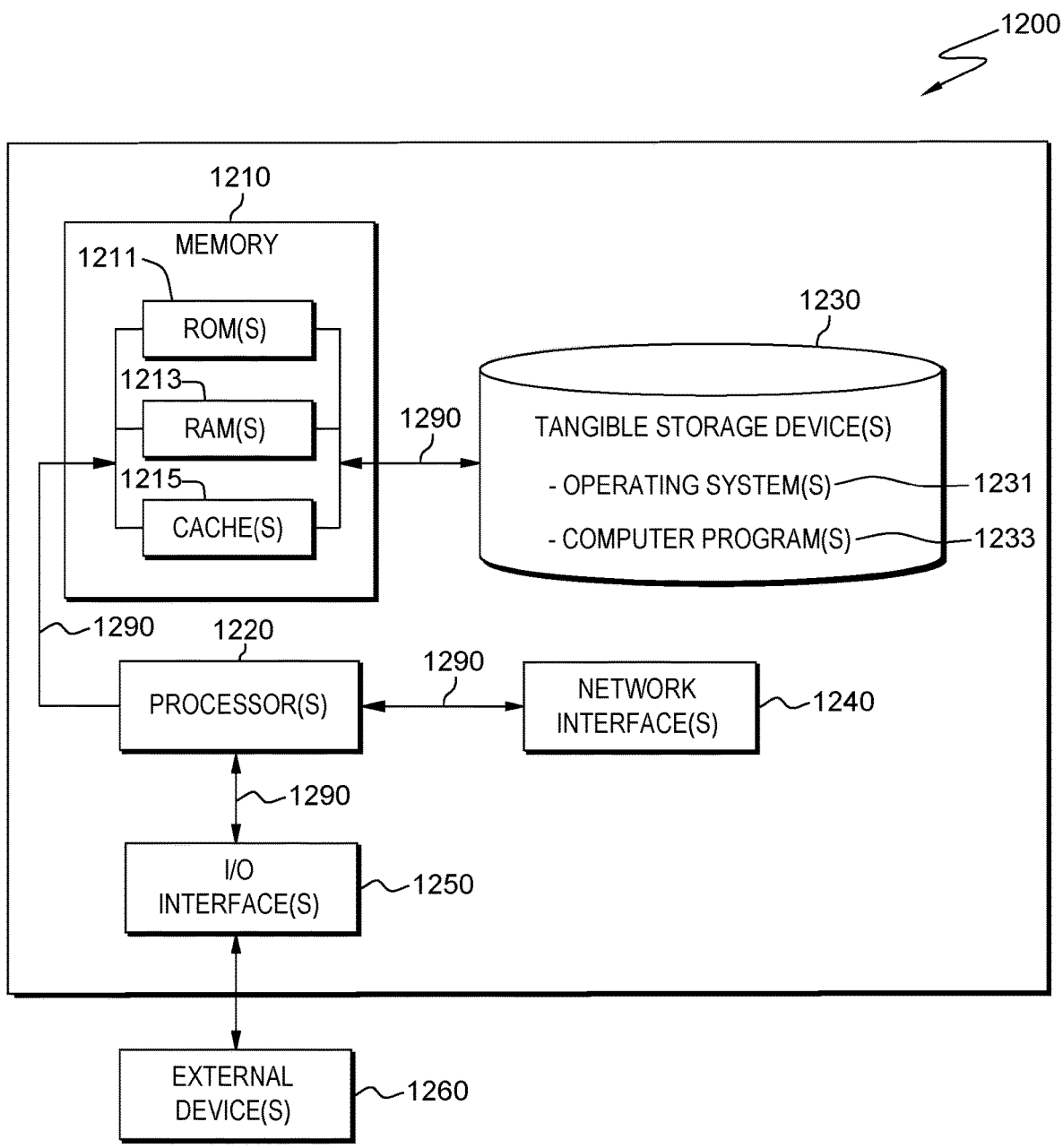
FIG. 12 is a diagram illustrating components of a computing device or a server for evaluation and modification of training data for classifiers, in accordance with one embodiment of the present invention.

FIG. 12 is a diagram illustrating components of computing device or server 1200 for evaluation and modification of training data for classifiers, in accordance with one embodiment of the present invention. It should be appreciated that FIG. 12 provides only an illustration of one implementation and does not imply any limitations with regard to the environment in which different embodiments may be implemented.

Referring to FIG. 12, computing device 1200 includes processor(s) 1220, memory 1210, and tangible storage device(s) 1230. In FIG. 12, communications among the above-mentioned components of computing device 1200 are denoted by numeral 1290. Memory 1210 includes ROM(s) (Read Only Memory) 1211, RAM(s) (Random Access Memory) 1213, and cache(s) 1215. One or more operating systems 1231 and one or more computer programs 1233 reside on one or more computer readable tangible storage device(s) 1230.

Computing device 1200 further includes I/O interface(s) 1250. I/O interface(s) 1250 allows for input and output of data with external device(s) 1260 that may be connected to computing device 1200. Computing device 1200 further includes network interface(s) 1240 for communications between computing device 1200 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for evaluation and modification of training data for classifiers of an automatic answering system, the method comprising:
    generating, by a computer system, multiple training data sets focus on a class, from training data of all classes, each of the multiple training data sets including training data with a class value of the class and training data without the class value of the class;
    generating, by the computer system, multiple classifiers for the class, learned from respective ones of the multiple training data sets;
    applying, by the computer system, the training data with the class value to the multiple classifiers;
    acquiring, by the computer system, classification results for respective ones of the multiple classifiers;
    performing, by the computer system, evaluation and validation of the training data with the class value, based on the classification results;
    modifying, by the computer system, the training data to create first modified training data, based on results of the evaluation and the validation of the training data with the class value and in response to determining that the training data with the class value is misclassified;
    performing, by the computer system, evaluation and validation of the first modified training data for all representative classes, and analyzing correlations between the representative classes;
    modifying, by the computer system, the first modified training data to create second modified training data, based on results of the evaluation and the validation of the first modified training data and based on the correlations;
    obtaining, by the computer system, a classification model learned by applying classification algorithm to the second modified training data; and
    deploying, by the computer, the classification model to the automatic answering system.

2. The method of claim 1, for the modifying the training data to create the first modified training data, further comprising:
    changing, by the computer system, a class value of a piece of the training data, in response to determining that classification precision of the piece of the training data is lower than a predetermined value and a representative class for the piece of the training data is a single class.

3. The method of claim 1, for the modifying the training data to create the first modified training data, further comprising:
    deleting, by the computer system, a piece of the training data, in response to determining that classification precision of the piece of the training data is lower than a predetermined value and a representative class for the piece of the training data is plural.

4. The method of claim 1, for the modifying the first modified training data to create the second modified training data, further comprising:
    removing, by the computer system, a class, in response to determining that classification precision of the class is lower than a predetermined value and a representative class for the class is plural.

5. The method of claim 1, for the modifying the first modified training data to create the second modified training data, further comprising:
    merging, by the computer system, two classes to one, in response to determining that classification precision for each of the two classes is lower than a predetermined value and a representative class of one of the two classes belongs to another one of the two classes.

6. The method of claim 1, wherein an analysis of a type I error is performed in the performing the evaluation and the validation of the training data for each class, wherein an analysis of a type II error is performed in the performing the evaluation and the validation of the training data for the representative classes.

7. A computer program product for evaluation and modification of training data for classifiers of an automatic answering system, the computer program product comprising one or more computer-readable tangible storage devices and program instructions stored on at least one of the one or more computer-readable tangible storage devices, the program instructions executable to:
    generate, by a computer system, multiple training data sets focus on a class, from training data of all classes, each of the multiple training data sets including training data with a class value of the class and training data without the class value of the class;
    generate by the computer system, multiple classifiers for the class, learned from respective ones of the multiple training data sets;
    apply, by the computer system, the training data with the class value to the multiple classifiers;
    acquire, by the computer system, classification results for respective ones of the multiple classifiers;
    perform, by the computer system, evaluation and validation of the training data with the class value, based on the classification results;
    modify, by the computer system, the training data to create first modified training data, based on results of the evaluation and the validation of the training data with the class value and in response to determining that the training data with the class value is misclassified;
    perform, by the computer system, evaluation and validation of the first modified training data for all representative classes, and analyze correlations between the representative classes;

modify, by the computer system, the first modified training data to create second modified training data, based on results of the evaluation and the validation of the first modified training data and based on the correlations;

obtaining, by the computer system, a classification model learned by applying classification algorithm to the second modified training data; and deploying, by the computer, the classification model to the automatic answering system.

8. The computer program product of claim 7, for modifying the training data to create the first modified training data, further comprising the program instructions executable to:

change, by the computer system, a class value of a piece of the training data, in response to determining that classification precision of the piece of the training data is lower than a predetermined value and a representative class for the piece of the training data is a single class.

9. The computer program product of claim 7, for modifying the training data to create the first modified training data, further comprising the program instructions executable to:

delete, by the computer system, a piece of the training data, in response to determining that classification precision of the piece of the training data is lower than a predetermined value and a representative class for the piece of the training data is plural.

10. The computer program product of claim 7, for modifying the first modified training data to create the second modified training data, further comprising the program instructions executable to:

remove, by the computer system, a class, in response to determining that classification precision of the class is lower than a predetermined value and a representative class for the class is plural.

11. The computer program product of claim 7, for modifying the first modified training data to create the second modified training data, further comprising the program instructions executable to:

merge, by the computer system, two classes to one, in response to determining that classification precision for each of the two classes is lower than a predetermined value and a representative class of one of the two classes belongs to another one of the two classes.

12. The computer program product of claim 7, wherein an analysis of a type I error is performed in performing the evaluation and the validation of the training data for each class, wherein an analysis of a type II error is performed in performing the evaluation and the validation of the training data for the representative classes.

13. A computer system for evaluation and modification of training data for classifiers of an automatic answering system, the computer system comprising:

one or more processors, one or more computer readable tangible storage devices, and program instructions stored on at least one of the one or more computer readable tangible storage devices for execution by at least one of the one or more processors, the program instructions executable to:

generate, by a computer system, multiple training data sets focus on a class, from training data of all classes, each of the multiple training data sets including training data with a class value of the class and training data without the class value of the class;

generate by the computer system, multiple classifiers for the class, learned from respective ones of the multiple training data sets;

apply, by the computer system, the training data with the class value to the multiple classifiers;

acquire, by the computer system, classification results for respective ones of the multiple classifiers;

perform, by the computer system, evaluation and validation of the training data with the class value, based on the classification results;

modify, by the computer system, the training data to create first modified training data, based on results of the evaluation and the validation of the training data with the class value and in response to determining that the training data with the class value is misclassified;

perform, by the computer system, evaluation and validation of the first modified training data for all representative classes, and analyze correlations between the representative classes;

modify, by the computer system, the first modified training data to create second modified training data, based on results of the evaluation and the validation of the first modified training data and based on the correlations;

obtaining, by the computer system, a classification model learned by applying classification algorithm to the second modified training data; and deploying, by the computer, the classification model to the automatic answering system.

14. The computer system of claim 13, for modifying the training data to create the first modified training data, further comprising the program instructions executable to:

change, by the computer system, a class value of a piece of the training data, in response to determining that classification precision of the piece of the training data is lower than a predetermined value and a representative class for the piece of the training data is a single class.

15. The computer system of claim 13, for modifying the training data to create the first modified training data, further comprising the program instructions executable to:

delete, by the computer system, a piece of the training data, in response to determining that classification precision of the piece of the training data is lower than a predetermined value and a representative class for the piece of the training data is plural.

16. The computer system of claim 13, for modifying the first modified training data to create the second modified training data, further comprising the program instructions executable to:

remove, by the computer system, a class, in response to determining that classification precision of the class is lower than a predetermined value and a representative class for the class is plural.

17. The computer system of claim 13, for modifying the first modified training data to create the second modified training data, further comprising the program instructions executable to:

merge, by the computer system, two classes to one, in response to determining that classification precision for each of the two classes is lower than a predetermined value and a representative class of one of the two classes belongs to another one of the two classes.

18. The computer system of claim 13, wherein an analysis of a type I error is performed in performing the evaluation and the validation of the training data for each class, wherein an analysis of a type II error is performed in performing the evaluation and the validation of the training data for the representative classes.

\* \* \* \* \*